US008876681B2

(12) United States Patent
Taketsugu et al.

(10) Patent No.: US 8,876,681 B2
(45) Date of Patent: Nov. 4, 2014

(54) COUNTER EJECTOR AND CARTON FORMER

(75) Inventors: Masahiro Taketsugu, Hiroshima-ken (JP); Masayoshi Tanchi, Hiroshima-ken (JP); Shinya Iori, Hiroshima-ken (JP)

(73) Assignee: Mitsubishi Heavy Industries Printing & Packaging Machinery, Ltd., Hiroshima (JP)

( * ) Notice: Subject to any disclaimer, the term of this patent is extended or adjusted under 35 U.S.C. 154(b) by 650 days.

(21) Appl. No.: 12/670,286

(22) PCT Filed: Jul. 28, 2008

(86) PCT No.: PCT/JP2008/063523
§ 371 (c)(1),
(2), (4) Date: Jan. 22, 2010

(87) PCT Pub. No.: WO2009/025152
PCT Pub. Date: Feb. 26, 2009

(65) Prior Publication Data
US 2010/0190626 A1 Jul. 29, 2010

(30) Foreign Application Priority Data
Aug. 23, 2007 (JP) ................. 2007-217314

(51) Int. Cl.
*B31B 1/62* (2006.01)
(52) U.S. Cl.
USPC ......................................... 493/142; 493/141
(58) Field of Classification Search
USPC ............................ 493/142, 141, 143; 414/901
See application file for complete search history.

(56) References Cited

U.S. PATENT DOCUMENTS

| 3,346,128 | A | * | 10/1967 | Hullhorst | 414/789.1 |
| 3,598,252 | A | * | 8/1971 | Billett et al. | 414/789.6 |
| 3,744,649 | A | * | 7/1973 | Ward, Jr. | 414/788.7 |
| 3,834,290 | A | * | 9/1974 | Nelson | 414/789.1 |
| 3,908,539 | A | * | 9/1975 | O'Brien | 100/49 |
| 3,941,048 | A | * | 3/1976 | Oe et al. | 100/215 |
| 4,043,458 | A | * | 8/1977 | Schott, Jr. | 414/789 |

(Continued)

FOREIGN PATENT DOCUMENTS

| JP | 9208112 A | 8/1997 |
| JP | 10212038 A | 8/1998 |
| JP | 2000127262 A | 5/2000 |
| JP | 200762923 A | 3/2007 |

OTHER PUBLICATIONS

European Patent Office communication Report EP 08791758 issued Jul. 21, 2011.
ISR for PCT/JP2008/063523, mailed Aug. 26, 2008.

(Continued)

*Primary Examiner* — Sameh H. Tawfik
(74) *Attorney, Agent, or Firm* — Lowe Hauptman & Ham, LLP

(57) ABSTRACT

A counter ejector has: a ledge that moves toward an inner side of a hopper to receive boxes S in the hopper when the boxes accumulated in the hopper reach the predetermined number; a press bar that is disposed so as to move vertically relative to the ledge, and presses the batch on the elevator by moving vertically downward relative to the ledge; and a relative movement servo motor that moves the press bar vertically relative to the ledge. The press bar is driven by the relative movement servo motor to vertically move relative to the ledge.

4 Claims, 10 Drawing Sheets

(56) References Cited

U.S. PATENT DOCUMENTS

| | | |
|---|---|---|
| 4,055,257 A | 10/1977 | Krebs |
| 4,311,475 A * | 1/1982 | Imai .............................. 493/142 |
| 4,573,958 A * | 3/1986 | Biesinger ...................... 493/415 |

OTHER PUBLICATIONS

Chinese Notification of Grant for Application No. 200880103288.8 mailed May 30, 2012.

Second Communication under Rule 71(3) EPC dated May 15, 2013 corresponds to European patent Application No. 08 791 758.9.

European Notice of Grant issued on Aug. 24, 2012, in corresponding European Application No. EP 08 791 758.9.

Japanese Decision of a Patent Grant for Application No. 2007-217314 mailed Oct. 16, 2012.

\* cited by examiner

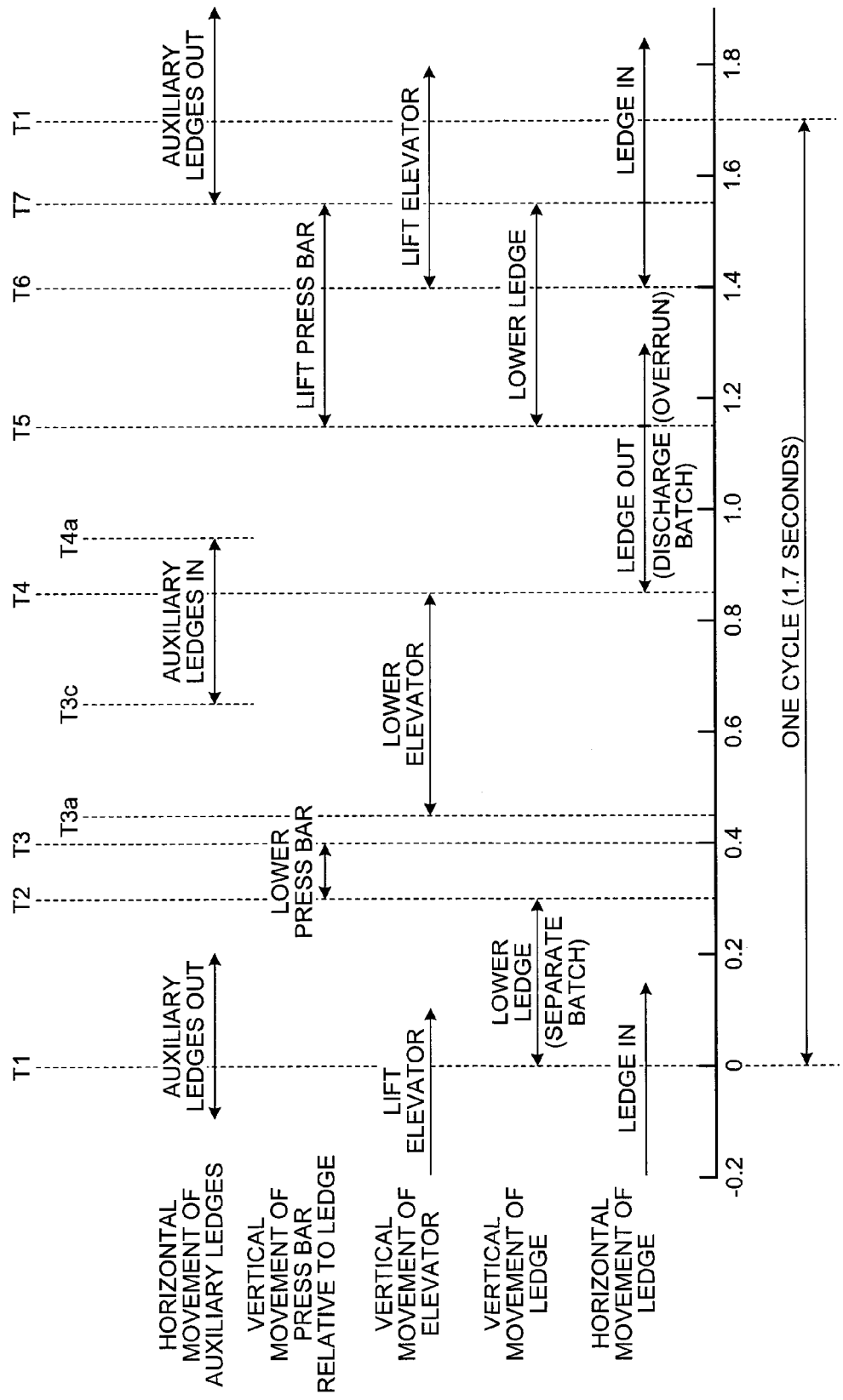

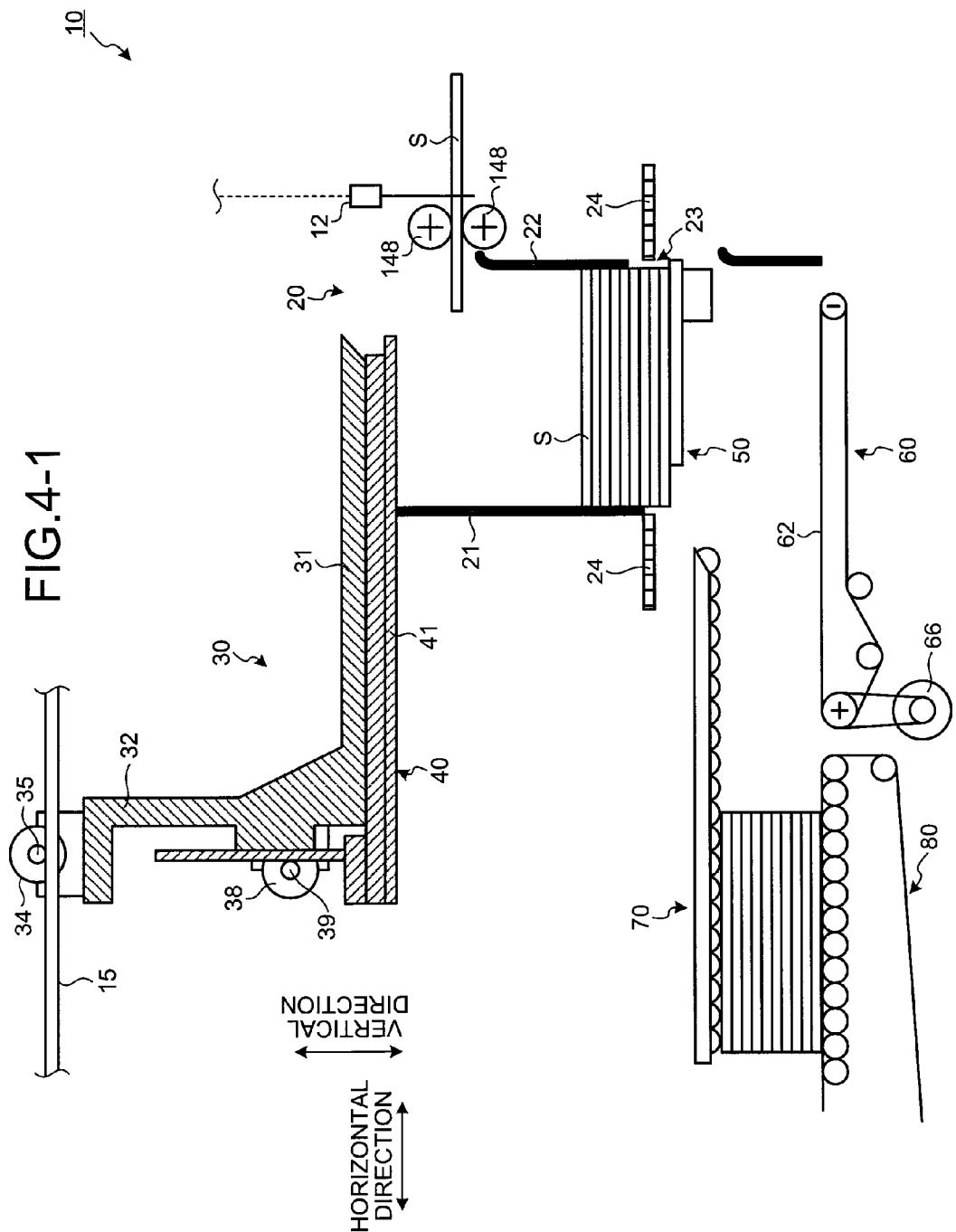

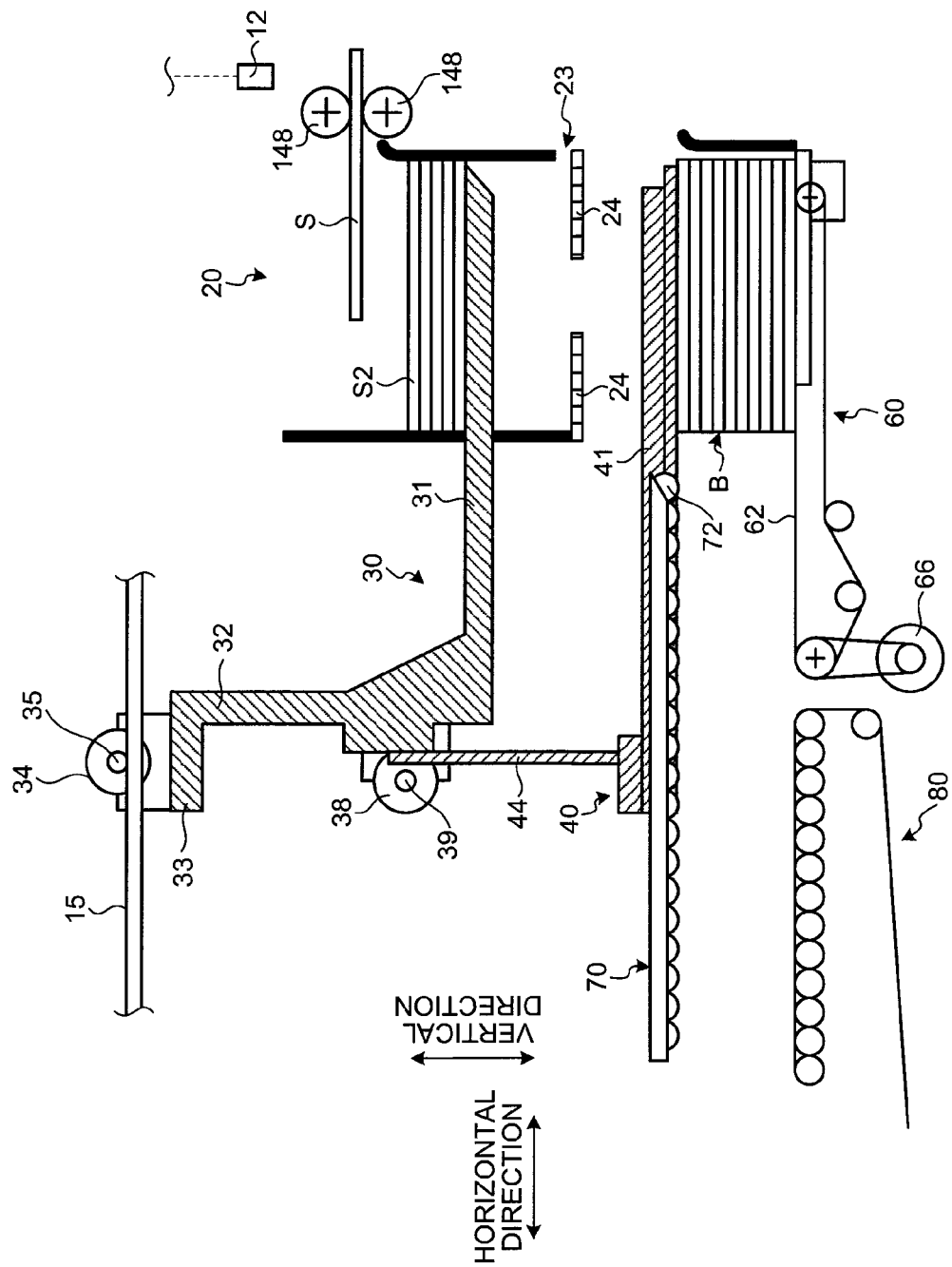

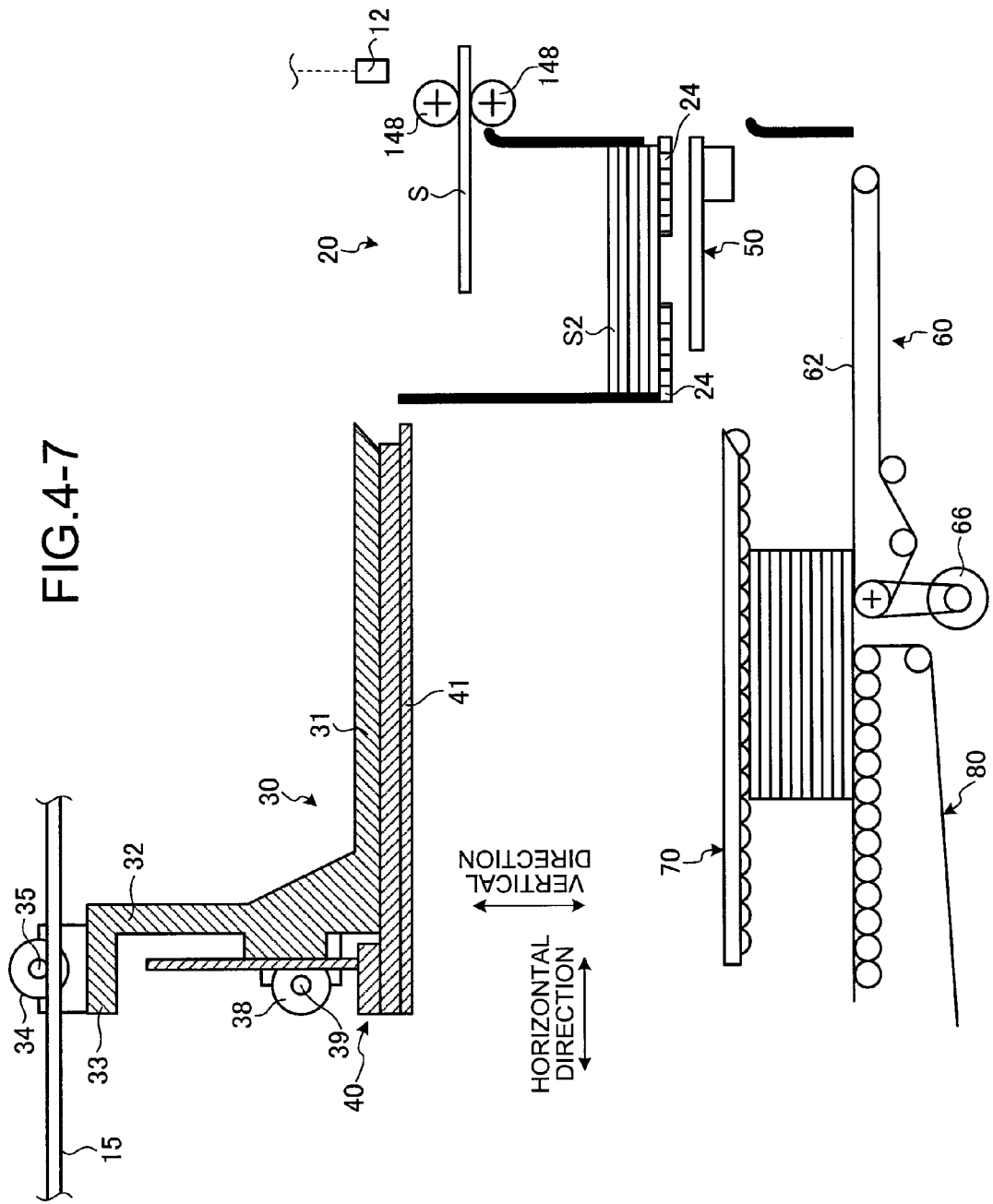

COUNTER EJECTOR AND CARTON FORMER

RELATED APPLICATIONS

The present application is national phase of PCT/JP2008/063523 filed Jul. 28, 2008, and claims priority from, Japanese Application Number 2007-217314, filed Aug. 23, 2007, the disclosures of which are hereby incorporated by reference herein in their entirety.

TECHNICAL FIELD

The present invention relates to a counter ejector that counts folded boxes to make the predetermined number of folded boxes into a bundle and feeds the bundle to a post process, and, in particular, a counter ejector used in a carton former in which a corrugated board box is manufactured.

BACKGROUND ART

A carton former in which corrugated board sheets are processed into corrugated board boxes includes a flexo rotary die cutter with which sheets are stamped into a predetermined shape, a flexo folder gluer that is an apparatus that folds and applies glue to corrugated board sheets, and the like. The flexo folder gluer generally has a paper feeding unit that feeds corrugated board sheets, a printing unit that performs printing on the corrugated board sheets, a slotter creaser that rules lines on and cuts grooves in the corrugated board sheets to form joint flaps to form a box, a folding unit that folds the sheets along the lines to join the joint flaps, and a counter ejector that counts the sheets to make the predetermined number of sheets into a bundle.

The counter ejector generally has a hopper that receives folded boxes fed from the folding unit, a ledge that works when boxes accumulated in the hopper reaches the preset number to form a bundle (hereinafter referred to as a batch) and receives the boxes to be the next batch, and a press bar that applies pressure to the batch discharged from the hopper. The counter ejector counts the number of boxes from the folding unit, makes the predetermined number of boxes into a batch, and sends the batch out to a post process (e.g., a binding machine).

Recently, such a carton former is sometimes required to produce corrugated board boxes with the number of sheets per batch decreased and the number of batches increased, therefore, a shortened time required for a process per batch (hereinafter referred to as a cycle time) has been demanded.

Examples of the counter ejector include one described in Patent Document 1. Patent Document 1 discloses a counter ejector including a blower blowing air to a batch above an elevator, and pressing the batch with the air pressure from the blower.

[Patent Document 1] Japanese Patent No. 2000-127262

DISCLOSURE OF INVENTION

Problem to be Solved by the Invention

For shortening the time required for a process per batch (hereinafter referred to as a cycle time), the counter ejector described above has been required to increase in speed of moving parts included in the counter ejector, e.g., an elevator, a ledge, and a press bar, and improve responsiveness of the moving parts. Because the operation performed by the moving parts has increased in speed, the operation thereof is required to be stabilized on high-speed operation performed by the counter ejector.

The present invention has been made in view of the problem described above, and an object of the present invention is to provide a counter ejector and a carton former having moving parts capable of high-speed operation in a stable manner.

Means for Solving Problem

According to an aspect of the present invention, a counter ejector that counts folded boxes to make predetermined number of the folded boxes into a batch and feeds the batch to a post process, the counter ejector includes: a hopper that receives the boxes and accumulates the boxes therein; a lower conveyer that is disposed below the hopper, and moves a belt horizontally to send the batch to the post process; a ledge that moves toward an inner side of the hopper to receive the boxes in the hopper when the boxes accumulated in the hopper reach the predetermined number; an elevator that is disposed below the hopper so as to move up and down, so that the elevator receives the boxes accumulated in the hopper when lifted, and places the batch of the boxes on the lower conveyer when lowered; a press bar that is disposed so as to be moveable vertically with respect to the ledge, and presses the batch on the elevator by moving vertically downward relative to the ledge; and a relative movement servo motor that moves the press bar vertically relative to the ledge.

Advantageously, the counter ejector further includes a controlling unit that controls the relative movement servo motor. The controlling unit includes an output torque controlling unit that controls an output torque of the relative movement servo motor such that the press bar presses the batch with a predetermined force; a lowering completion position detecting unit that detects a lowering completion position that is a lifted/lowered position of the press bar when the press bar presses the batch with the predetermined force; a lifted/lowered position determining unit that determines the lifted/lowered position of the press bar when pressing a next batch based on the detected lowering completion position of the press bar; and a rotational position controlling unit that controls a rotational position of the relative movement servo motor to position the determined lifted/lowered position.

Advantageously, in the counter ejector, one of the ledge and the press bar has a rack, and the other has a pinion meshed with the rack, and the relative movement servo motor rotates the pinion.

Advantageously, in the counter ejector, the ledge is driven to move horizontally by a horizontal movement servo motor, the lower conveyer is driven to move the belt horizontally by a belt-driving servo motor. The controlling unit includes a synchronous controlling unit that controls a horizontal driving motor and the belt-driving servo motor such that the belt of the lower conveyer and the press bar synchronously move horizontally, in a condition that the press bar pressing the batch placed on the lower conveyer.

According to another aspect of the present invention, a carton former includes: a paper feeding unit that sends out stacked corrugated board sheets one by one; a printing unit that performs printing on the corrugated board sheets; a slotter creaser that rules lines on and cuts grooves in the corrugated board sheets to form joint flaps; a folding unit that provides glue to and folds the joint flaps along the ruled lines to join the joint flaps; and a counter ejector that counts folded boxes, and forms a batch of a predetermined number of the folded boxes to send out. The counter ejector includes: a hopper that receives the boxes and accumulates the boxes therein; a lower conveyer that is disposed below the hopper, and moves a belt horizontally to send the batch to a post process; a ledge that moves toward an inner side of the hopper to receive the boxes in the hopper when the boxes accumulated in the hopper reach the predetermined number; an elevator that is disposed below the hopper so as to be lifted and lowered, so that the elevator receives the boxes accumulated in the hopper when lifted, and places the batch of the boxes on the lower conveyer when lowered; a press bar that is disposed so as to move vertically with respect to the ledge, and presses the batch on the elevator by moving vertically downward relative to the ledge; and a relative movement servo motor that moves the press bar vertically relative to the ledge.

Effects of the Invention

In the counter ejector according to the present invention, because the press bar is driven by the relative movement servo motor to be moved relative to the ledge in the vertical direction, the press bar can be operated at high speed in a stable manner, compared with when the press bar is driven with a pneumatic actuator and the like, leading to a shortened cycle time required for a process per batch.

In the counter ejector according to the present invention, because the controlling unit that controls the relative movement servo motor controls the lifted/lowered position of the press bar that presses the batch by using the rotational position of the relative movement servo motor, the batch can be pressed rapidly by the press bar so as to have a predetermined thickness, regardless of variation of the reaction force acting to the press bar from the batch, compared with a torque control of the relative movement servo motor. As a result, the time required for pressing the batch can be shortened, thereby shortening the cycle time for a process per batch.

In the counter ejector according to the present invention, because one of the ledge and the press bar has the rack and the other has the pinion meshed with the rack, and the relative movement servo motor rotates the pinion, operational responsiveness of the press bar to the ledge can be improved, compared with a pneumatic actuator.

In the counter ejector according to the present invention, because the controlling unit controls the horizontal movement servo motor and the belt-driving servo motor, with the press bar pressing the batch placed on the lower conveyer, such that the belt of the lower conveyer and the press bar are synchronously moved in the horizontal direction, the batch can be conveyed horizontally to the post process while sandwiched between the lower conveyer and the press bar. The batch can be discharged from the lower conveyer, while the boxes forming the batch are prevented from collapsing. Unlike the conventional technique, the batch can be discharged from the lower conveyer without a pusher that pushes out the batch toward the horizontal direction.

BRIEF DESCRIPTION OF DRAWINGS

FIG. 3 is a timing chart for explaining a series of operations of a ledge, auxiliary ledges, an elevator, and a press bar according to the embodiment.

FIG. 4-1 is a schematic of operation performed by the counter ejector according to the embodiment, illustrating a time point when lowering the ledge starts for separating a batch in a hopper.

FIG. 4-2 is a schematic of operation performed by the counter ejector according to the embodiment, illustrating a time point when lowering the press bar starts upon completion of lowering the ledge.

FIG. 4-3 is a schematic of operation performed by the counter ejector according to the embodiment, illustrating a time point of completion of lowering the press bar.

FIG. 4-4 is a schematic of operation performed by the counter ejector according to the embodiment, illustrating a time point when conveying the batch to a discharge conveyer starts upon completion of lowering the elevator.

FIG. 4-5 is a schematic of operation performed by the counter ejector according to the embodiment, illustrating a time point when lifting the press bar that has been lowered to compress the batch starts.

FIG. 4-6 is a schematic of operation performed by the counter ejector according to the embodiment, illustrating a time point when lifting the elevator that has been lowered to a belt of a lower conveyer starts.

FIG. 4-7 is a schematic of operation performed by the counter ejector according to the embodiment, illustrating a time point when moving the auxiliary ledges outside the hopper starts upon completion of lifting the ledge and the press bar.

Figure 1:
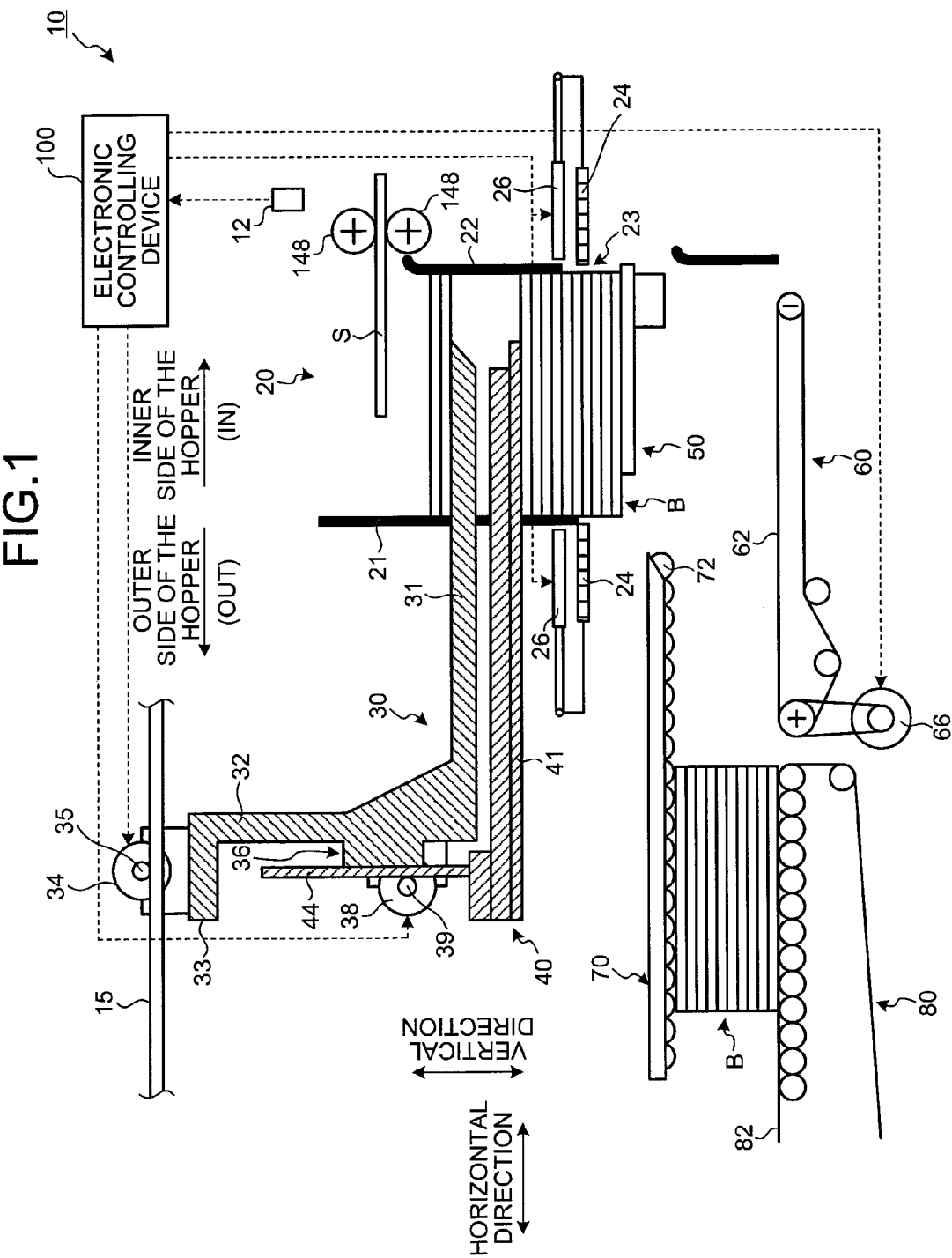
FIG. 1 is a sectional view of a counter ejector according to an embodiment.

EXPLANATIONS OF LETTERS OR NUMERALS 1 carton former
10 counter ejector
12 counting sensor
20 hopper
24 auxiliary ledge
30 ledge
40 press bar
50 elevator
60 lower conveyer
70 upper conveyer
80 discharge conveyer
100 electronic controlling device (controlling unit, output torque controlling unit, lowering completion position detecting unit, lifted/lowered position determining unit, rotational position detecting unit)
110 paper feeding unit
120 printing unit
130 slotter creaser
140 folding unit
148 exit roll

BEST MODE(S) FOR CARRYING OUT THE INVENTION

The present invention is explained in detail below with reference to the attached drawings. The present invention is not limited by the embodiment below. In addition, the component parts in the embodiment include what a person skilled in the art can easily envision, or substantially the same component parts.

Embodiment

Figure 2:
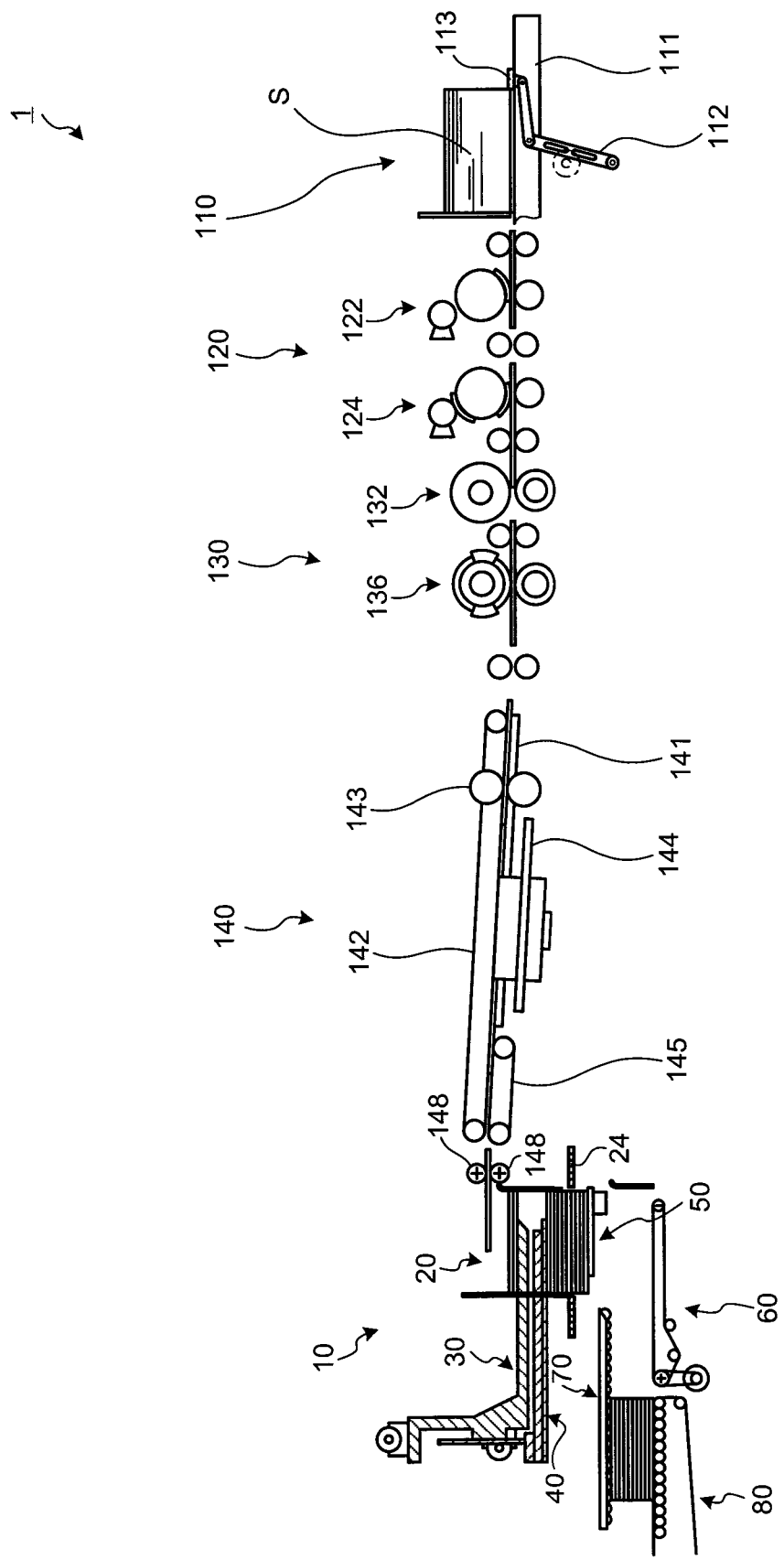
FIG. 2 is a sectional view depicting process steps of a carton former according to the embodiment.

A configuration of a carton former and a counter ejector according to the embodiment is explained with the aid of FIGS. 1 and 2. FIG. 1 is a sectional view of the counter ejector. FIG. 2 is a sectional view for explaining process steps of the carton former.

As shown in FIG. 2, a carton former 1 is used to process corrugated board sheets to manufacture corrugated board boxes (hereinafter simply referred to as "boxes") folded into sheets. Corrugated board sheets herein are manufactured by gluing a flat liner (liners) to a single side or both sides of a corrugated medium formed into a waveform with an unshown corrugating machine and the like. The carton former 1 according to the embodiment is a so-called folder gluer that is an apparatus that folds and applies glue to fed corrugated board sheets and makes the predetermined number of sheets into a bundle.

The carton former 1 includes a paper feeding unit 110 that sends out stacked corrugated board sheets one by one; a printing unit 120 that performs printing on the corrugated board sheets; a slotter creaser 130 that rules lines on and cuts grooves in the corrugated board sheets to form joint flaps; a folding unit 140 that provides glue to and folds the joint flaps along the lines to join the joint flaps; and a counter ejector 10 that counts folded boxes to make the predetermined number of folded boxes S into a bundle to send them out.

The paper feeding unit 110 includes a table 111 on which a large number of corrugated board sheets manufactured by a corrugating machine and the like are stacked. The paper feeding unit 110 feeds the corrugated board sheets one by one to the printing unit 120 by kicking off the lowermost corrugated board sheet of the corrugated board sheets by a kicker 113 that reciprocates with the aid of a crank-lever mechanism 112.

The printing unit 120 has a plurality of printing units 122 and 124, both of which have inking rolls (not shown) each having a different color. The printing unit 120 performs double-color printing on the corrugated board sheets with the printing units 122 and 124 and feeds the sheets to the slotter creaser 130.

The slotter creaser 130 has a lining roll 132 that performs line process, and a slotter 136 that performs grooving process. On the corrugated board sheets fed from the printing unit 120, the lining roll 132 forms lines and the slotter 136 forms grooves. Thereafter, the slotter creaser 130 feeds the corrugated board sheets with the lines and the joint flaps formed thereon to the folding unit 140.

The folding unit 140 is a unit that provides glue to and folds the joint flaps along the lines to adhere them, while the corrugated board sheets are moved. The folding unit 140 includes a guide rail 141 disposed along a conveyance direction of the corrugated board sheets, and an annular conveying belt 142 provided rotatably above the guide rail 141. On the guide rail 141 and the conveying belt 142, a glue applying device 143, a folding bar 144, and a folding belt 145 are disposed.

In the folding unit 140, as the corrugated board sheets with the lines and the joint flips formed thereon move while supported by the guide rail 141 and the conveying belt 142, the glue applying device 143 applies glue to the joint flaps, and the folding bar 144 folds the corrugated board sheets. Moreover, in the folding unit 140, the folded boxes S are fabricated by pressing the folded corrugated board sheets with the folding belt 145 to adhere the joint flaps of the corrugated board sheets. In the folding unit 140, then, the folded boxes S are fed to the counter ejector 10 through a pair of exit rolls 148.

The counter ejector 10 is an apparatus that counts the fed boxes folded to make the predetermined number of boxes into a bundle B (hereinafter referred to as a batch), and sends the bundle to a post process in which an unshown binding machine is used, as shown in FIG. 1. The counter ejector 10 includes an electronic controlling device 100 (hereinafter simply referred to as a "controlling device") as a controlling unit that detects signals from various sensors and controls operations of various actuators and motors.

The counter ejector 10 has a hopper 20 that receives the fed boxes S to vertically stack and align the boxes S for accumulation; and auxiliary ledges 24 that can receive the boxed S accumulated in the hopper 20 on a bottom 23 of the hopper 20 by moving to protrude toward an inner side of the hopper (denoted by letters IN, in the diagram).

The hopper 20 has a butting plate 21 that the boxes S fed from the exit rolls 148 of the folding unit 140 abuts; and an angle fixing plate 22 that aligns, along with the butting plate 21, the boxes S stacked in the hopper 20. In the hopper 20, the butting plate 21 stops horizontal movement of the boxes S from the exit rolls 148 to make the boxes S fall vertically downward, i.e., toward the bottom 23 of the hopper 20. The angle fixing plate 22 aligns, along with the butting plate 21, the ends of each box S vertically stacked. As a result, in the hopper 20, the folded boxes S can be vertically stacked and aligned to be stacked on the auxiliary ledges 24, a ledge 30, or an elevator 50.

Each of the auxiliary ledges 24 is provided adjacent to the bottom 23 of the hopper 20, and made of a horizontally movable plate-like member. The auxiliary ledges 24 can receive the boxes S fed into the hopper 20 from a preceding step by moving horizontally inside the hopper and protruding to the inner side of the hopper from the butting plate 21 and the angle fixing plate 22. Consequently, in the counter ejector 10, the boxes S can be accumulated to form the batch B in the hopper 20.

On the contrary, when the auxiliary ledges 24 are horizontally moved out of the hopper and retracted to the outer side of the hopper from the butting plate 21 and the angle fixing plate 22, the bottom 23 of the hopper 20 is fully opened so that the boxes S (batch B) fed into the hopper 20 can be discharged from the bottom 23 of the hopper 20 to the elevator 50, which will be described later. Accordingly, in the counter ejector 10, the batch B formed in the hopper 20 can be passed to the elevator 50, which will be described later. The horizontal movement of the auxiliary ledges 24 herein is driven by pneumatic actuators 26. The driving of the actuators 26, i.e., the horizontal movement of the auxiliary ledges 24 is controlled by the controlling device 100.

The counter ejector 10 also has an optical counting sensor 12 as a unit that counts the number of boxes S fed into the hopper 20. The counting sensor 12 counts the number of boxes S passing between the exit rolls 148 to be fed to the hopper 20, and transmits signals relating to the number of boxes S to the electronic controlling device 100.

Moreover, the counter ejector 10 includes a lower conveyer 60 that is disposed below the hopper 20 and capable of sending out the batch B placed on a belt 62 toward a post process; and the elevator 50 that is so disposed below the hopper 20 as to be lifted or lowered, so that the elevator 50 receives the batch B discharged from the bottom of the hopper 20 while lifted to the side of the hopper 20, and place the batch B on the lower conveyer 60 while lowered to the side of the lower conveyer 60.

The lower conveyer 60 is a belt conveyer, and disposed below the bottom 23 of the hopper 20. The lower conveyer 60 can horizontally convey the batch B discharged from the bottom 23 of the hopper 20 and placed on the belt 62 by the elevator 50 to a discharge conveyer 80. The lower conveyer 60 has a belt-driving servo motor 66 as a drive source for driving a belt 62. The output torque, the rotational speed, the rotational position and the like of the belt-driving servo motor 66 can be numerically controlled by the controlling device 100. That is, the horizontal-movement of the belt 62 of the lower belt 60 is controllable by the controlling device 100.

The "servo motor" herein means an electric motor capable of feedback (closed-loop) control of the rotational speed, with the rotational position and the like of the output shaft as a target value. Specifically, a permanent magnet alternating current synchronous motor (brushless direct current (DC) motor) is used therefor.

The elevator 50 is so disposed below the hopper 20 as to be lifted and lowered vertically between the bottom 23 of the hopper 20 and the belt 62 of the lower conveyer 60. The elevator 50 can receive the batch B of the boxes S accumulated in the hopper 20 by moving vertically to the side of the hopper 20, i.e., by lifting. On the other hand, the elevator 50 can place the batch B from the hopper 20 on the belt 62 of the lower conveyer 60 by moving vertically to the side of the lower conveyer 60, i.e., by lowering. The vertical movement, i.e., lifting and lowering of the elevator 50 is controlled by the controlling device 100.

In addition, the counter ejector 10 includes an upper conveyer 70 provided to have a predetermined interval with the lower conveyer 60; and the discharge conveyer 80 disposed horizontally adjacent to the lower conveyer 60 and to have a predetermined interval in a vertical direction with the upper conveyer 70.

The discharge conveyer 80 is a belt conveyer, and disposed horizontally adjacent to the lower conveyer 60 and to have a predetermined interval in a vertical direction with the upper conveyer 70. The discharge conveyer 80 can convey the batch B conveyed from the lower conveyer 60 to a process following the process in the counter ejector 10 by moving a belt 82 in a direction toward the horizontally outer side of the hopper.

The upper conveyer 70 is a so-called roller conveyer, with a plurality of rollers 72 each having both ends supported rotatably on a frame. A part of the upper conveyer 70 close to the hopper faces the lower conveyer 60, and a part remote from the hopper faces the discharge conveyer 80. Consequently, in the counter ejector 10, the batch B can be conveyed to a post process in which a binding machine (not shown) and the like is used while having a predetermined thickness by being sandwiched between the upper conveyer 70 and the lower conveyer 60 or the discharge conveyer 80.

The upper conveyer 70 can move vertically by an unshown actuator that is controlled by the controlling device 100. A lifted/lowered position of the upper conveyer 70, i.e., a vertical gap between the rollers 72 of the upper conveyer 70 and the belt 62 of the lower conveyer 62, and a vertical gap between the rollers 72 and a belt 82 of the discharge conveyer 80, are adjustable by the controlling device 100.

Moreover, the counter ejector 10 has the ledge 30 that separates the predetermined number of boxes S in the hopper 20 into the batch B by moving toward the inner side of the hopper when the boxes accumulated in the hopper 20 reach the predetermined number to receive the boxes S from the exit rolls 148; and a press bar 40 capable of horizontal movement along with the ledge 30 and a relative movement to the ledge 30 in the vertical direction, and thus can press the batch B on the elevator 50.

The ledge 30 has a separating unit 31 extending in the horizontal direction, and a stay 32 projected upward from the separating unit 31. The press bar 40 is disposed below the ledge 30. The ledge 30 and the press bar 40 can move horizontally with respect to the hopper 20 by a rack and pinion mechanism, and a motor 34 that rotatably drives a pinion 35.

Specifically, the motor 34 (hereinafter, referred to as a horizontal movement servo motor) that moves the ledge 30 in the horizontal direction is mounted on an upper end 33 of the stay 32 in the ledge 30. To the output shaft of the horizontal movement servo motor 34, the pinion 35 is coupled. The pinion 35 is meshed with a rack 15 extending in the horizontal direction. The rack 15 is prevented from moving horizontally with respect to the apparatus main body including the hopper 20.

The output torque, the rotational speed, the rotation angle, and the like of the horizontal movement servo motor 34 can be adjusted through numerical control. In addition, the horizontal movement servo motor 34 has a rotary encoder (not shown) for detecting the rotation angle of the pinion 35 and transmitting a signal relating to the rotation angle to the controlling device 100. The horizontal movement servo motor 34 rotatably drives the pinion 35, whereby the ledge 30 and the press bar 40 can be moved horizontally with respect to the apparatus main body including the hopper 20. That is, the rotation of the pinion 35, i.e., the horizontal movement of the ledge 30 and the press bar 40 is controlled by the controlling device 100.

The rack 15 can be moved vertically with respect to the apparatus main body including the hopper 20 by an unshown actuator. That is, the ledge 30 can move vertically, along with the press bar 40, with respect to the apparatus main body including the hopper 20. The vertical movement of the rack 15 with respect to the hopper 20, i.e., the vertical movement of the ledge 30 is controlled by the controlling device 100.

The controlling device 100 controls the ledge 30 so that the ledge 30 can receive the boxes S fed into the hopper 20 from the exit rolls 148 by horizontally moving the separating unit 31 toward the inner side of the hopper to protrude to the inner side of the hopper from the butting plate 21. In other words, when the boxes S accumulated in the hopper 20 reach the predetermined number, the ledge 30 separates the predetermined number of boxes S in the hopper 20 into the batch B by moving horizontally toward the inner side of the hopper.

On the other hand, the press bar 40 has a pressing unit 41 that extends in the horizontal direction and presses the batch B; and a rack 44 that projects upward from the pressing unit 41 and has a gear formed at the side thereof remote from the hopper. The press bar 40 can be moved relative to the ledge 30 in the vertical direction by a rack and pinion mechanism and a motor 38 (hereinafter referred to as a relative movement servo motor) that rotatably drives a pinion 39.

In the ledge 30, the relative movement servo motor 38 for the vertical movement of the press bar 40 relative to the ledge 30 is mounted on an area 36 remote from the hopper of the stay 32. To the output shaft of the relative movement servo motor 38, coupled is the pinion 39 that is meshed with the rack 44 of the press bar 40.

The relative movement servo motor 38 is an electric motor capable of adjusting the output torque, the rotational speed, the rotation angle, and the like through numerical control. Specifically, a permanent magnet alternating current synchronous motor (brushless direct current (DC) motor) is used therefor. The relative movement servo motor 38 has a rotary encoder (not shown) for detecting the rotation angle of the pinion 39 to transmit a signal relating to the rotation angle to the controlling device 100. The relative movement servo motor 38 rotatably drives the pinion 39, whereby the press bar 40 can be moved relative to the ledge 30 in the vertical direction. That is, the rotation of the pinion 39, i.e., the relative movement of the press bar 40 in the vertical direction to the ledge 30 is controlled by the controlling device 100.

The press bar 40 is controlled by the controlling device 100 to press the batch B on the elevator 50 by moving vertically downward relative to the ledge 30 (hereinafter simply referred to as "lowering"), thereby vertically compressing the batch B to a predetermined thickness. Accordingly, the relative movement servo motor 38 can move the press bar 40 relative to the ledge 30 in the vertical direction.

Control performed by the controlling device of the counter ejector according to the present embodiment, and operations performed by the component units of the counter ejector will now be explained with the aid of FIG. 3 and FIGS. 4-1 to 4-7. For counting boxes fed to the hopper, making the predetermined number of boxes into a batch, and feeding the batch to the discharge conveyer, the controlling device as a controlling unit of the counter ejector performs the control of batch processing, which is explained below. FIG. 3 is a timing chart for explaining a series of operations performed by the ledge, the auxiliary ledges, the elevator, and the press bar.

Figures 2, 4:
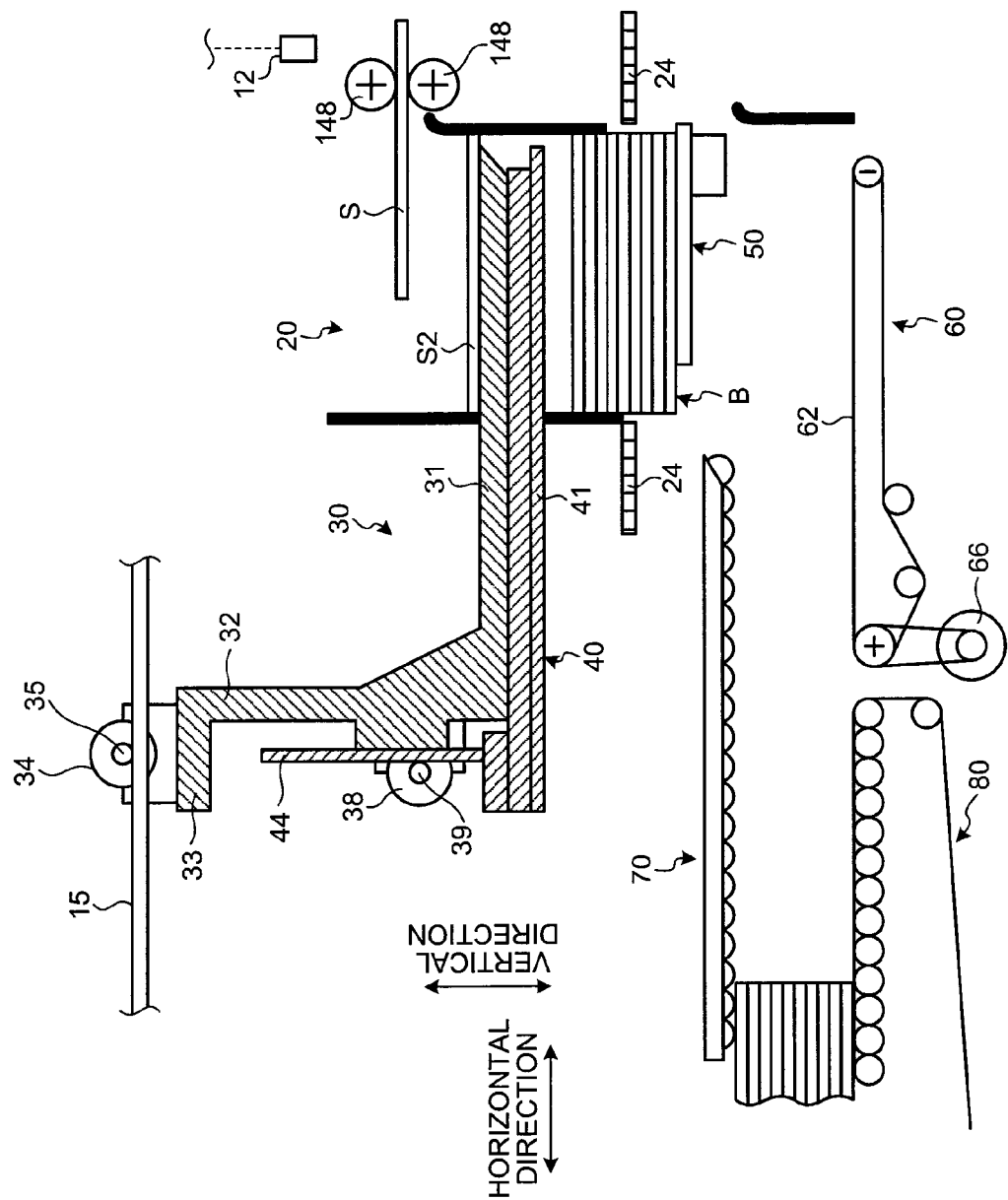
Figures 3, 4:
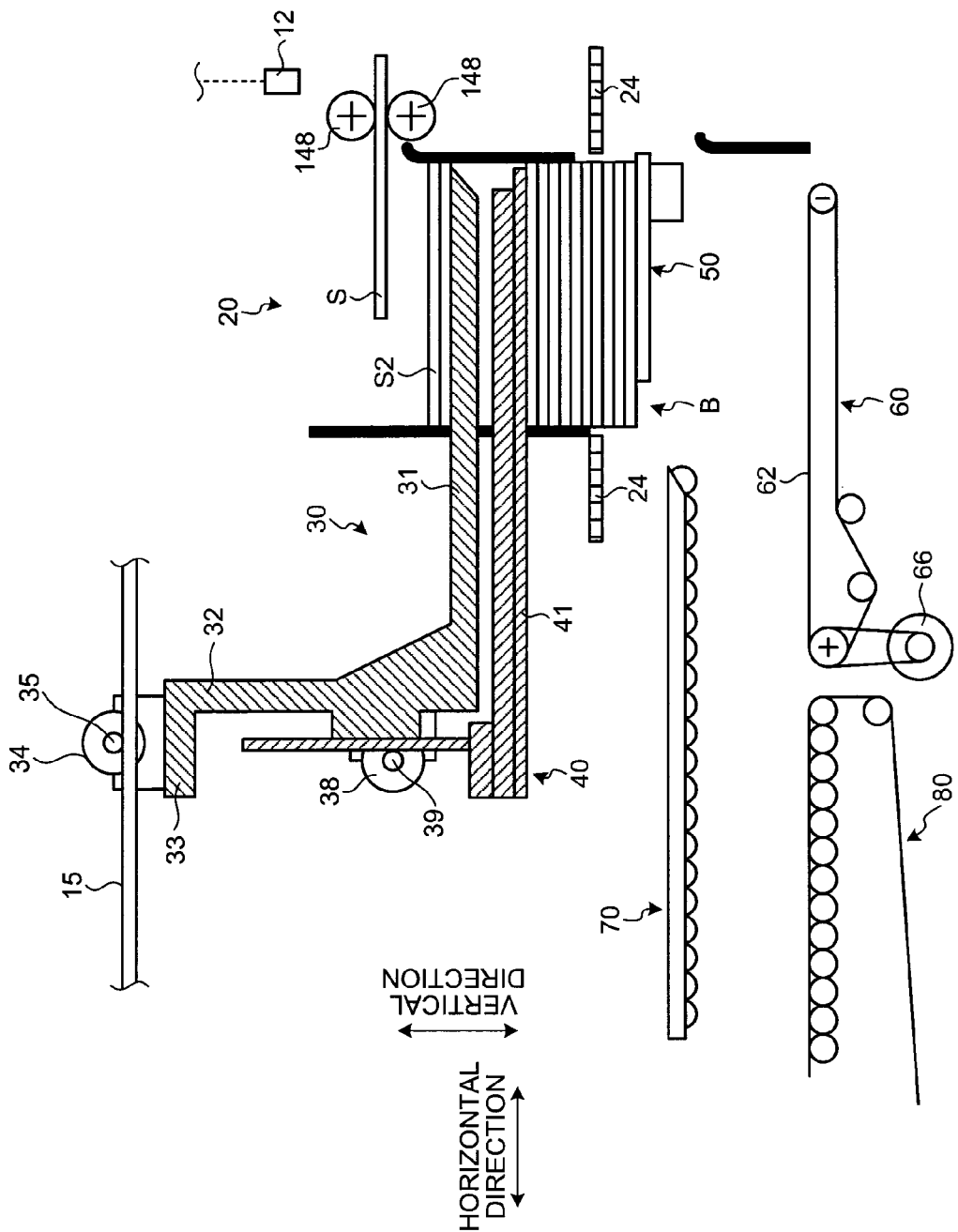
Figures 4, 5:
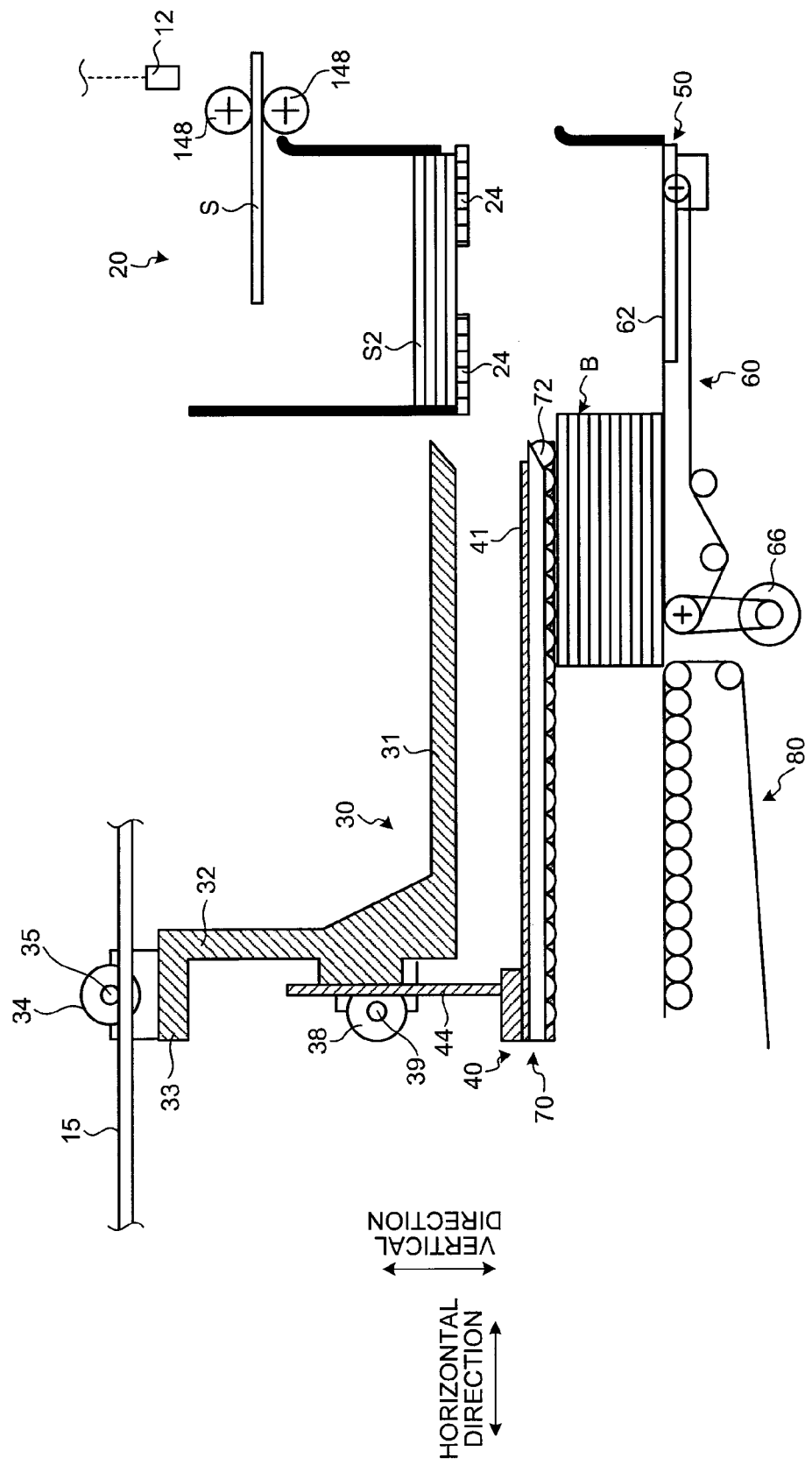
Figures 4, 5, 6:
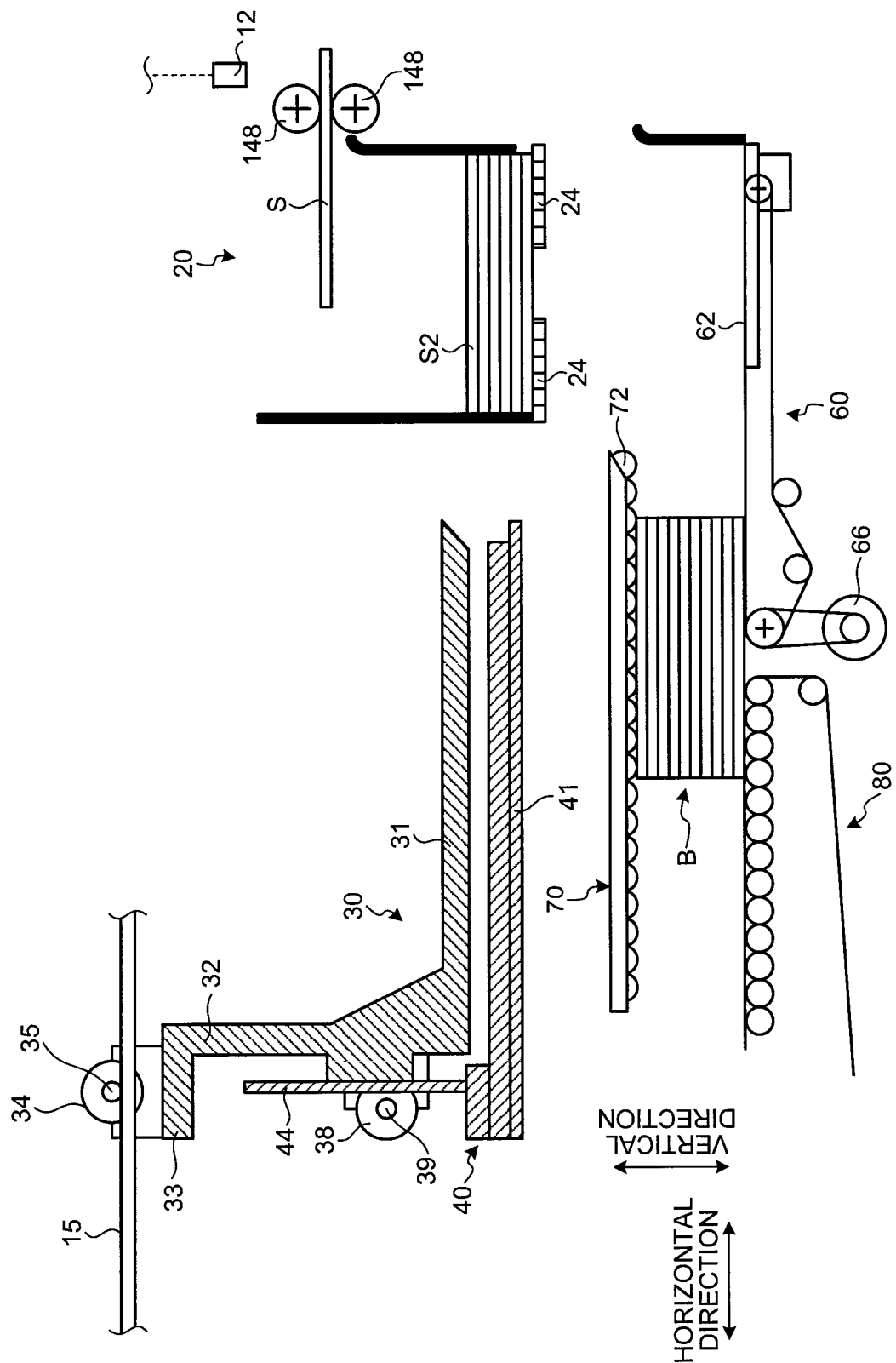

FIG. 4-1 is a schematic for explaining operation performed by the counter ejector, illustrating a time point when lowering the ledge starts for separating a batch in the hopper. FIG. 4-2 is a schematic for explaining operation performed by the counter ejector, illustrating a time point when lowering the press bar starts upon completion of lowering the ledge. FIG. 4-3 is a schematic for explaining operation performed by the counter ejector, illustrating a time point of completion of lowering the press bar. FIG. 4-4 is a schematic for explaining operation performed by the counter ejector, illustrating a time point when conveying the batch to the discharge conveyer starts upon completion of lowering the elevator. FIG. 4-5 is a schematic for explaining operation performed by the counter ejector, illustrating a time point when lifting the press bar that has been lowered to compress the batch starts. FIG. 4-6 is a schematic for explaining operation performed by the counter ejector, illustrating a time point when lifting the elevator that has been lowered to the belt of the lower conveyer starts. FIG. 4-7 is a schematic for explaining operation performed by the counter ejector, illustrating a time point when moving the auxiliary ledges outside the hopper starts upon completion of lifting the ledge and the press bar. For simple explanation, in FIGS. 4-1 to 4-7, illustration of the controlling device and the like is omitted.

In the present embodiment, the number of boxes S to form a single batch B is set to ten, and the cycle time required for a process per batch B is about 1.7 seconds.

At the time point T1, as shown in FIG. 3 and FIG. 4-1, in the counter ejector 10, the boxes S pass through the exit rolls 148 to be fed into the hopper 20, and the number of the boxes S passed through the exit rolls 148 is counted to transmit signals relating to the boxes S to the controlling device 100 with the counting sensor 12. At this time, by the controlling device 100, the auxiliary ledges 24 are moved toward the outer side of the hopper, the elevator 50 is lifted, and the ledge 30 is moved toward the inner side of the hopper. The controlling device 100 causes the separating unit 31 of the ledge 30 and the pressing unit 41 of the press bar 40 to protrude to the inner side of the hopper from the butting plate 21, while causing the separating unit 31 and the pressing unit 41 to stand by above the exit rolls 148 in the vertical direction. Consequently, in the hopper 20, the boxes S are stacked on the elevator 50.

The time point T1 (0 second) is a time point immediately before the boxes S stacked in the hopper 20 reaches the predetermined number (ten boxes). From the time point T1, the controlling device 100 starts to lower the ledge 30 along with the press bar 40 so as to be positioned below the exit rolls 148 in the vertical direction.

At the time point T2 (after 0.3 second), the controlling device 100 completes lowering the ledge 30 and the press bar 40, as shown in FIG. 4-2. The separating unit 31 of the ledge 30 is positioned below the exit rolls 148, and the ledge 30 receives the boxes S2 to form a next batch in the hopper 20. On the elevator 50, ten boxes S are stacked to form the batch B. The ledge 30 thus separates the predetermined number (ten) of boxes S into the batch B, in the hopper 20.

Between the time points T2 and T3, the controlling device 100 controls the relative movement servo motor 38 to start lowering the press bar 40 relative to the ledge 30. Specifically, the controlling device 100 performs control to set the output torque of the relative movement servo motor 38 to zero, cause the press bar 40 to be lowered by its own weight, and adjust the output torque of the relative movement servo motor 38, so that the press bar 40 presses the batch B with a predetermined force.

To apply the batch B with a force of 10 kilogram-weight with the press bar 40 having a weight of 50 kilograms, for example, the controlling device 100 causes the relative movement servo motor 38 to produce a torque in a direction to lift the press bar 40 with a force of 40 kilogram-weight. As a result, a gravitational force exerting on the press bar 40 overcomes the force to lift the press bar 40, thereby exerting the force of 10 kilogram-weight on the batch B by the press bar 40.

At the time point T3 (after 0.4 second), the controlling device 100 detects the lifted/lowered position of the elevator 50, and the lifted/lowered position of the press bar 40 immediately after the completion of lowering the press bar 40, as shown in FIG. 4-3. Hereinafter, the lifted/lowered positions of the ledge 30 and the press bar 40 are referred to as a "lowering completion position". The lowering completion position can be calculated from the rotational position of the rotary encoder of the relative movement servo motor 38. Consequently, the controlling device 100 can detect the distance between the pressing unit 41 of the press bar 40 and the elevator 50, i.e., the thickness of the batch B pressed to be compressed vertically by the press bar 40.

Information relating to the detected lowering completion positions of the ledge 30 and the press bar 40, or information on the thickness of the batch B is stored in the controlling device 100. Based on the detected thickness of the batch B, the controlling device 100 can set the gap between: the upper conveyer 70; and the lower conveyer 60 and the discharge conveyer 80, and adjust the lifted/lowered position of the upper conveyer 70.

The controlling device 100 starts lowering the elevator 50 at the time point T3*a*, and starts moving the auxiliary ledges 24 toward the inner side of the hopper at the time point T3*c* after the batch B is discharged from the bottom 23 of the hopper 20.

At the time point T4 (after 0.85 second), lowering the elevator 50 is completed and the batch B is placed on the belt 62, which is not moving, of the lower conveyer 60, as shown in FIG. 4-4. Thereafter, the controlling device 100 starts discharging the batch B to the post process.

Specifically, for conveying the batch B to the discharge conveyer 80, the controlling device 100 controls the belt-driving servo motor to move the belt 62 of the lower conveyer 60 in a direction toward the horizontally outer side of the hopper, while controlling the horizontal movement servo motor 34, thereby moving the ledge 30 and the press bar 40 outside the hopper. At this time, the controlling device 100 synchronously controls the belt-driving servo motor 66 for the lower conveyer 60 and the horizontal movement servo motor 34, so that the moving speed of the belt 62 of the lower conveyer 60, i.e., the conveying speed of the batch B, becomes equal to the moving speed of the pressing unit 41 of the press bar 40 toward the outer side of the hopper.

At the time point T5 (after 1.15 seconds), the batch B is interposed between the upper conveyer 70 and the discharge conveyer 80, with the batch B sandwiched between the belt 62 of the lower conveyer 60 and the pressing unit 41 of the press bar 40, as shown in FIG. 4-5. The boxes S2 forming the "next batch" that have been received with the separating unit 31 of the ledge 30 until the time point T4 are passed to the auxiliary ledges 24 in the hopper 20. Thereafter, the boxes S2 forming the next batch are piled up on the auxiliary ledges 24. Meanwhile, the batch B is sent out to the process following the process in the counter ejector 10 by the discharge conveyer 80.

Thus, the batch B can be conveyed horizontally to the discharge conveyer 80 in the counter ejector 10, while sandwiched between the lower conveyer 60 and the press bar 40. With the boxes S to form the batch B prevented from collapsing, the batch B can be discharged from the lower conveyer 60. Unlike the conventional technique, the batch B can be discharged from the lower conveyer 60 without a pusher that pushes out the batch B toward the outer side of the hopper in the horizontal direction. In the counter ejector 10, an operation to stand by the ledge 30 and the press bar 40 outside the hopper, and an operation to discharge the batch B are achieved by a single operation.

From the time point T5, the controlling device 100 starts lifting the ledge 30 and at the same time, controls the relative movement servo motor 38 to lift the press bar 40 toward the ledge 30 so that the pressing unit 41 of the press bar 40 overlaps the separating unit 31 of the ledge 30.

At the time point T6 (after 1.4 seconds), the controlling device 100 starts lifting the elevator 50, and at the same time, starts moving the ledge 30 toward the inner side of the hopper so as to stand by for the next separation, as shown in FIG. 4-6. At this time, the boxes S2 to form the next batch are piled up on the auxiliary ledges 24 in the hopper 20.

At the time point T7 (after 1.55 seconds), lifting the ledge 30 and the press bar 40 are completed and the ledge 30 and the press bar 40 are in a stand-by state, as shown in FIG. 4-7. At this time, the elevator 50 is lifted near the bottom 23 of the hopper 20. From the time point T7, the controlling device 100 starts moving the auxiliary ledges 24 toward the outer side of the hopper. When the auxiliary ledges 24 are retracted to the outside of the hopper, and the bottom 23 of the hopper 20 is opened, the "next batch" of the boxes S2 will be piled up on the elevator 50.

Then, returning to the time point T1 (see FIG. 4-1) a cycle to process the next batch of the boxes S2 begins. The process for the next batch differs from the above-described batch processing in the control of the relative movement servo motor 38 when lowering the press bar 40 (see time points T2 to T3).

Immediately after the time point T3, the information on the lowering completion positions of the ledge 30 and the press bar 40, or the information on the thickness of the batch B is stored in the controlling device 100, and based on the information, the lifted/lowered position upon pressing the "next batch" of the boxes S2 with the press bar 40 is determined. The lifted/lowered position may be the same as the lowering completion position that is the lifted/lowered position of the immediately preceding batch B, or may set to be slightly above or below the lowering completion position. The controlling device 100, based on the determined lifted/lowered position, controls the relative movement servo motor 38 to lower the press bar 40 not with the output torque, but with the rotational position.

Thus, in the present embodiment, the press bar 40 is driven to be moved relative to the ledge 30 in the vertical direction, by the relative movement servo motor 38. As a result, in the counter ejector 10, the press bar 40 can be driven toward the ledge 30 at a high speed in a stable manner, compared with when driven by a pneumatic actuator. Accordingly, the cycle time required for a process per batch B can be shorter than that of a counterpart driven by a pneumatic actuator.

Moreover, in the present embodiment, because the lifted/lowered position of the press bar 40 that presses the batch B is controlled by the controlling device 100 that controls the relative movement servo motor 38 with the rotational position of the relative movement servo motor 38, the batch can be pressed rapidly so as to have a predetermined thickness, regardless of variation of the reaction force acting to the press bar 40 from the batch, compared with a control of the relative movement servo motor 38 with torque. As a result, the time required for pressing the batch (corresponding to the time points T2 to T3) can be shortened, thereby shortening the cycle time for a process per batch.

Moreover, in the present embodiment, because one of the ledge 30 and the press bar 40 has the rack 44 and the other has the pinion 39 meshed with the rack, and the relative movement servo motor 38 rotatably drives the pinion 39, the operational responsiveness of the press bar 40 to the ledge 30 can be improved, compared with a counterpart driven by a pneumatic actuator.

In addition, in the present embodiment, because the controlling device 100 as a controlling unit controls the horizontal movement motor 34 and the belt-driving servo motor 66 so that the belt 62 of the lower conveyer 60 and the press bar 40 are synchronously moved in the horizontal direction, with the press bar 40 pressing the batch B placed on the lower conveyer 60, the batch B can be conveyed horizontally to the post process while sandwiched between the lower conveyer 60 and the press bar 40. With the boxes S to form the batch B prevented from collapsing, the batch B can be discharged from the lower conveyer 60. Unlike the conventional technique, the batch B can be discharged from the lower conveyer 60 without a pusher that pushes out the batch B toward the horizontal direction.

INDUSTRIAL APPLICABILITY

As can be seen, the counter ejector according to the present embodiment is useful for a carton former in which a box is made of a corrugated board sheet.

The invention claimed is:

1. A counter ejector that counts folded boxes to make a predetermined number of the folded boxes into a batch and feeds the batch to a post process, the counter ejector comprising:
  a hopper that receives the boxes and accumulates the boxes therein;
  a lower conveyer that is disposed below the hopper, and moves a belt horizontally to send the batch to the post process;
  a ledge that moves toward an inner side of the hopper to receive the boxes in the hopper when the boxes accumulated in the hopper reach the predetermined number;
  an elevator that is disposed below the hopper so as to move up and down, so that the elevator receives the boxes accumulated in the hopper when lifted, and places the batch of the boxes on the lower conveyer when lowered;
  a press bar that is disposed below the ledge so as to be moveable vertically with respect to the ledge, and presses the batch on the elevator by moving vertically downward relative to the ledge;
  a relative movement servo motor that moves the press bar vertically relative to the ledge; and
  a controlling unit that controls the relative movement servo motor, wherein the controlling unit includes an output torque controlling unit that controls an output torque of the relative movement servo motor such that the press bar presses the batch with a predetermined force.

2. The counter ejector according to claim 1, wherein the controlling unit further includes:

a lowering completion position detecting unit that detects a lowering completion position that is a lifted/lowered position of the press bar when the press bar presses the batch with the predetermined force;

a lifted/lowered position determining unit that determines the lifted/lowered position of the press bar when pressing a next batch based on the detected lowering completion position of the press bar; and a rotational position controlling unit that controls a rotational position of the relative movement servo motor to position the press bar at the determined lifted/lowered position.

3. The counter ejector according to claim 1, wherein one of the ledge and the press bar has a rack, and the other has a pinion meshed with the rack, and the relative movement servo motor rotates the pinion.

4. The counter ejector according to claim 1, further comprising:

a horizontal movement servo motor that drives the ledge to move horizontally, and a belt-driving servo motor that drives the lower conveyer to move the belt horizontally, wherein the controlling unit further includes:

a synchronous controlling unit that controls the horizontal movement servo motor and the belt-driving servo motor such that the belt of the lower conveyer and the press bar synchronously move horizontally, in a condition that the press bar presses the batch placed on the lower conveyer.

* * * * *